(12) United States Patent
Pfeil et al.

(10) Patent No.: US 11,754,183 B2
(45) Date of Patent: Sep. 12, 2023

(54) MARINE SLIDE RING SEAL ARRANGEMENT

(71) Applicant: EagleBurgmann Germany GmbH & Co. KG, Wolfratshausen (DE)

(72) Inventors: Dieter Pfeil, Königsdorf (DE); Jurgen Binder, Penzberg (DE)

(73) Assignee: Eagle Burgmann Germany GmbH & Co. KG, Wolfratshausen (DE)

( * ) Notice: Subject to any disclaimer, the term of this patent is extended or adjusted under 35 U.S.C. 154(b) by 147 days.

(21) Appl. No.: 17/437,630

(22) PCT Filed: Feb. 25, 2020

(86) PCT No.: PCT/EP2020/054855
§ 371 (c)(1),
(2) Date: Sep. 9, 2021

(87) PCT Pub. No.: WO2020/182459
PCT Pub. Date: Sep. 17, 2020

(65) Prior Publication Data
US 2022/0186837 A1    Jun. 16, 2022

(30) Foreign Application Priority Data

Mar. 14, 2019  (DE) .................... 10 2019 203 454.3

(51) Int. Cl.
*F16J 15/3204* (2016.01)
*B63H 23/32* (2006.01)
(Continued)

(52) U.S. Cl.
CPC ........ *F16J 15/3204* (2013.01); *B63H 23/321* (2013.01); *F16J 15/3484* (2013.01); *F16J 15/406* (2013.01); *B63H 2023/327* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS 4,483,540 A    11/1984  Bordien et al.
6,481,720 B1 *  11/2002  Yoshida ................ F16J 15/002
                                                    277/927
(Continued)

FOREIGN PATENT DOCUMENTS

DE    102016203230 A1 *  8/2017
DE    102016203230 A1     8/2017
(Continued)

OTHER PUBLICATIONS

International Search Report issued in PCT/EP2020/054855, dated Jun. 17, 2020.

*Primary Examiner* — Nathan Cumar
(74) *Attorney, Agent, or Firm* — Locke Lord LLP; Scott D. Wofsy

(57) ABSTRACT

The invention relates to a marine meachanical seal arrangement comprising a first mechanical seal (2) comprising a first rotating slide ring (21) and a second stationary slide ring (22) defining a first sealing gap (23) between their two sliding surfaces (21a, 22a), a second meachanical seal (3) comprising a second rotating slide ring (31) and a second stationary slide ring (32), which define a second sealing gap (33) between their sliding surfaces (31a, 32a), a barrier circuit (10) comprising a barrier fluid cavity (8) which is arranged between the first mechanical seal (2) and the second mechanical seal (3) and is filled with a barrier fluid, the barrier fluid cavity (8) being divided into a first sub-cavity (81) and a second sub-cavity (82), the first subcavity (81) and the second subcavity (82) being separated by a flexible lip seal (7) wherein the second sub-cavity (82) is (Continued)

arranged at the second mechanical seal (3), and wherein the lip seal (7) is arranged such that a flow of barrier fluid from the first subcavity (81) into the second subcavity (82) is allowed and a flow of barrier fluid from the second subcavity to the first subcavity is prevented. (FIG. 2)

12 Claims, 2 Drawing Sheets

(51) Int. Cl.
*F16J 15/34* (2006.01)
*F16J 15/40* (2006.01)
(58) Field of Classification Search
CPC .. F16J 15/3208; F16J 15/3212; F16J 15/3216; F16J 15/322; F16J 15/34; F16J 15/3464; F16J 15/3484; F16J 15/40; F16J 15/406; B63H 23/00; B63H 23/32; B63H 23/321; B63H 2023/327

USPC .......................................................... 277/549
See application file for complete search history.

(56) References Cited

U.S. PATENT DOCUMENTS

2007/0147988 A1* 6/2007 Ito .......................... F04D 29/124
 415/169.1
2017/0335966 A1 11/2017 Werdecker et al.

FOREIGN PATENT DOCUMENTS

EP 2687762 A2 1/2014
EP 3438511 A1 2/2019

* cited by examiner

MARINE SLIDE RING SEAL ARRANGEMENT

CROSS-REFERENCE TO RELATED APPLICATIONS

This application is a U.S. National Phase Application filed under 35 U.S.C. § 371, based on International Patent Application No. PCT/EP2020/054855, filed Feb. 25, 2020, which claims priority to German Patent Application No. 10 2019 203 454.3, filed on Mar. 14, 2019, the entire contents of which is incorporated herein by reference.

The invention relates to a marine mechanical seal arrangement and a marine vehicle, e.g. ships, drilling rigs, etc., comprising such a mechanical seal arrangement. Furthermore, the invention relates to a marine propulsion system comprising a marine mechanical seal arrangement according to the invention.

In marine applications, one problem area is the aggressiveness of salt water. Another problem area herein is water pollution. In marine propulsion systems and the like, especially the bearings, which are usually oil-filled, are required to be sealed from seawater. Due to constantly tightening environmental regulations, the highest demands must be placed on such seals for drive shafts or bearings or the like.

It is therefore the object of the present invention to provide a marine mechanical seal arrangement and a marine drive which can prevent leakage of oil into the environment with maximum degree of safety and, especially, does not release oil into the surrounding water, even when the seal is damaged or fails, and having simple structure and simple, inexpensive manufacturability,.

This object will be solved by a marine mechanical seal arrangement having the features of claim 1 and a marine actuator having the features of claim 12. Further embodiments of the invention are represented in the subclaims.

The marine mechanical seal arrangement according to the invention having the features of claim 1 has the advantage that leakage of any oil or lubricant of a propulsion into the water surrounding the mechanical seal arrangement can be prevented. Furthermore, a reliable seal may be ensured even in the event of failure or standstill of the propulsion. According to the invention, this will be achieved by the marine mechanical seal arrangement comprising a first and a second mechanical seal. The two mechanical seals are arranged in series on a shaft which is to be sealed. The first mechanical seal arrangement comprises a first rotating slide ring and a second stationary slide ring, which define a first sealing gap between their two sliding surfaces. The second mechanical seal arrangement comprises a second rotating slide ring and a second stationary slide ring, which define a second sealing gap between their sliding surfaces. In addition, the marine mechanical seal arrangement comprises a barrier fluid circuit including a barrier fluid cavity and a rinsing fluid or barrier fluid. The barrier fluid circuit is also used for rinsing the mechanical seals. The barrier fluid cavity is arranged between the first and second mechanical seals which are connected in series, and is filled with the barrier fluid. The barrier fluid is an environmentally compatible fluid, for example a fluid containing glycol. The barrier fluid cavity between the first and second mechanical seal arrangements is separated into a first sub-cavity and a second sub-cavity, the separation being provided using a flexible lip seal. In this case, the second sub-cavity is arranged on the second mechanical seal. The lip seal is arranged such that a flow of barrier fluid from the first sub-cavity into the second sub-cavity is allowed, but a flow of barrier fluid from the second sub-cavity into the first sub-cavity is prevented. Thus, the lip seal opens only in one flow direction and remains closed in the other flow direction, even when large pressure differences between the first and second sub-cavity occur.

As the barrier fluid is present in the barrier fluid cavity, which is arranged between the first and second mechanical seals and thus between the outside surrounded by water and an oil or the like possibly contaminating the water as a lubricant, a pressure in the barrier fluid cavity is higher than the external pressure of the water and is higher than the pressure of the lubricant at the second mechanical seal during normal operation in which the barrier fluid is circulated in the barrier circuit. As a result, minimal leakage of the barrier fluid into the water may occur during normal operation, but this is acceptable if an environmentally acceptable fluid is used as the barrier fluid. Furthermore, a minimal leakage of barrier fluid into the lubricant area may also occur during normal operation, although this is also not critical since the small amount of barrier fluid in the lubricant does not affect the lubricating properties of the lubricant. Even when the drive shaft is at a standstill, a reliable seal is ensured by the first and second mechanical seals.

Particularly preferably, the first mechanical seal has a first slide ring carrier which is pretensioned in the axial direction using a first pretensioning element and wherein the first slide ring carrier is arranged so as to be axially movable. This enables immediate readjustment of the first mechanical seal in the axial direction in the event of axial movements of the shaft, which can occur during operation, so that no excessive leakage occurs when performing axial shaft movements.

Preferably, the first slide ring carrier holds the rotating slide ring.

Further preferably, the mechanical seal also comprises a second slide ring carrier which is axially pretensioned by a second pretensioning element and is arranged to be axially movable in the axial direction of the mechanical seal. This movable second slide ring carrier also allows the second mechanical seal to smoothly follow axial shaft movements in operation. The second slide ring carrier is preferably arranged on the stationary slide ring to hold it in place.

According to another preferred embodiment of the present invention, the marine mechanical seal arrangement comprises a third slide ring carrier which holds the second rotating slide ring of the second mechanical seal. Thereby, the lip seal seals at the third slide ring carrier. This allows particularly compact and simple design to be realized.

The third slide ring carrier preferably has a radially outwardly directed surface at which the lip seal seals. Preferably, the radially outwardly directed surface is parallel to a central axis of the marine mechanical seal arrangement. Particularly preferably, the contact surface at which the lip seal seals is coated with a hard layer. Preferably, the hard layer comprises chromium.

According to a particularly preferred embodiment of the invention, a first secondary sealing element is arranged on the first slide ring carrier. The first secondary sealing element is preferably an O-ring. The first secondary sealing element has a first axial deformation space immediately adjacent to the first secondary sealing element. This first axial deformation space directly adjacent to the first secondary sealing element can provide a mechanical seal suitable for pressure reversal. Thus, any reversal of pressure conditions at the mechanical seal wherein, for example, an external pressure of water becomes greater than a pressure in the barrier fluid cavity cannot affect the sealing properties of the marine mechanical seal arrangement. For example, such pressure reversal in such marine applications may occur during ship loading when the ship propulsion system is submerged deeper into the water due to loading. However, with such pressure reversal, the first axial deformation space can allow immediate deformation of the first secondary sealing element even when the external water pressure increases, thereby ensuring immediate advance and closure of the sealing gap onto the first mechanical seal.

To also render the second mechanical seal suitable for pressure reversal, a second secondary sealing element, especially an O-ring, is arranged on the second mechanical seal carrier, with a second axial deformation space being provided directly adjacent to the second secondary sealing element. This also enables the second mechanical seal to reliably seal in the event of a pressure reversal, when a pressure in the barrier fluid cavity falls below a pressure of the lubricating medium to be sealed. For example, such a case may occur when a leak occurs in the barrier fluid circuit to the outside (water) or when the first mechanical seal fails and the pressure in the barrier fluid cavity subsequently drops to the outside water pressure, for example, when the sliding surfaces of the first mechanical seal are damaged.

The barrier fluid circuit preferably comprises a barrier fluid reservoir and a pump, wherein the second sub-cavity of the barrier fluid cavity is connected to the barrier fluid reservoir via a return line, and wherein the barrier fluid reservoir is connected to the first sub-cavity of the barrier fluid cavity via a supply line. Preferably, the pump is disposed in the feed line between the barrier fluid reservoir and the first sub-cavity.

Further preferably, the lip seal is secured to a housing of the marine mechanical seal arrangement by a fixing ring and a plurality of fixing means, such as screws. A base body of the lip seal can thereby be clamped between the fixing ring and the housing.

Further preferably, the barrier circuit further comprises a water separator and/or a lubricant separator. The water separator can separate water that has entered the barrier fluid cavity via the first sealing gap. The lubricant separator can separate a lubricant that has entered the barrier fluid cavity via the second sealing gap.

Particularly preferably, the barrier fluid circuit is configured such that the pump is not operated at a constant rate, but rather a recirculation is performed at predetermined time intervals.

Furthermore, the present invention relates to a marine propulsion system, for example a thruster or a propeller for ships or drilling rigs or propeller nacelles or the like. For example, a preferred field of application is in deep-sea drilling rigs, which are no longer firmly anchored to the seabed but are held in position using a plurality of propulsions.

It should be noted that the marine mechanical seal arrangements according to the invention can be used not only in seawater, but of course also in freshwater for sealing at shafts of marine propulsion units or the like.

Hereinafter an embodiment of a marine mechanical seal arrangement and a marine propulsion system according to a preferred embodiment of the invention will be described in detail while reference will be made to the accompanying drawing, wherein.

In the following, a marine mechanical seal arrangement 1 according to a preferred embodiment of the invention is described in detail, while making reference to FIGS. 1 and 2.

Figure 1:
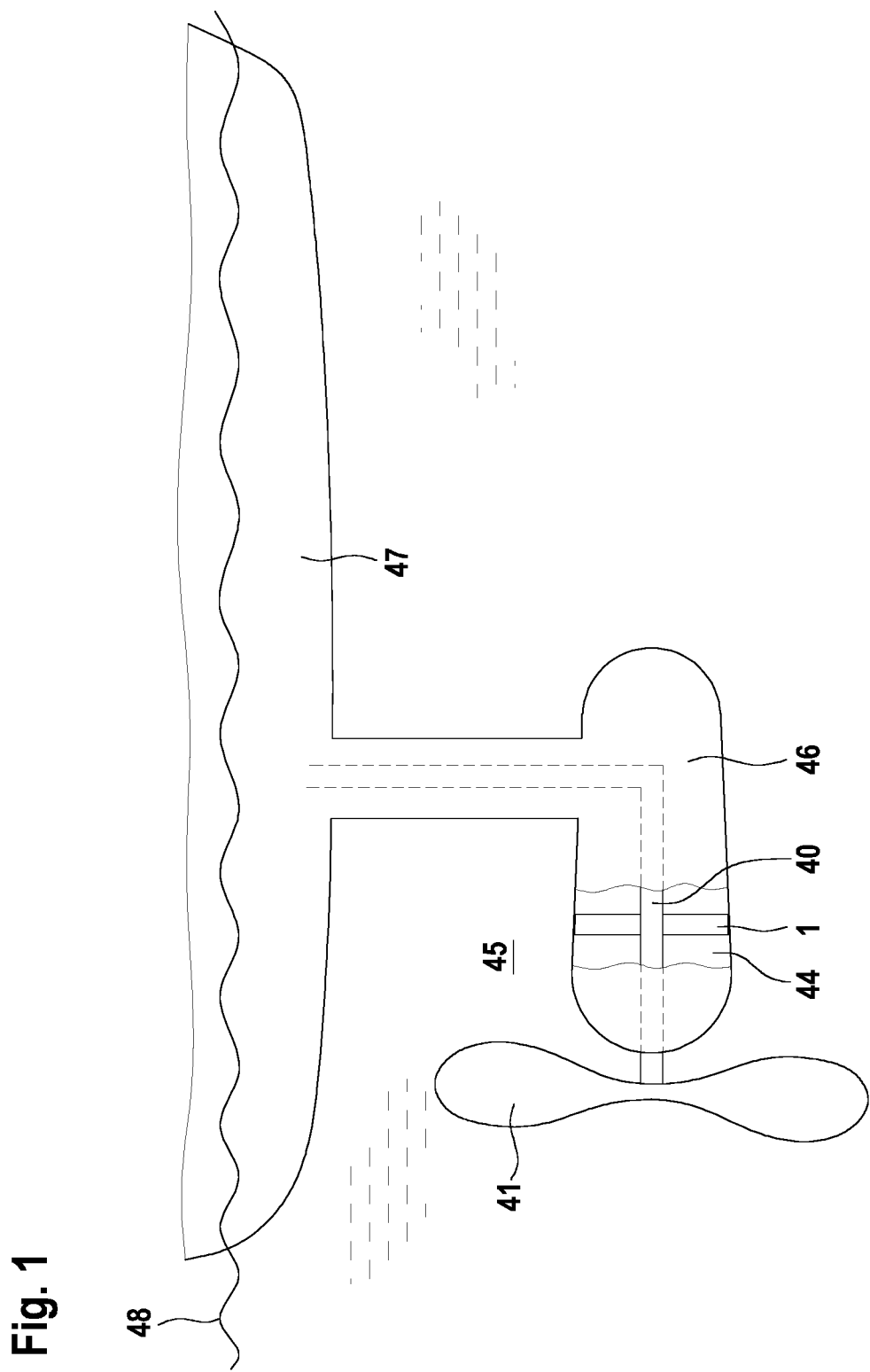
FIG. 1 shows a schematic view of a marine propulsion system.

FIG. 1 schematically shows the use of the marine mechanical seal arrangement 1 on a propeller nacelle 46 of a marine propulsion system.

In this case, the marine mechanical seal arrangement 1 seals at a drive shaft 40. The drive shaft 40 drives a propeller 41 of a ship 47. The propeller nacelle 46 is arranged on the hull in the usual manner on the underside thereof. The reference number 48 denotes a water line.

Thus, the mechanical seal arrangement 1 must seal a cavity 44 filled with a lubricating medium from the water environment 45.

Figure 2:
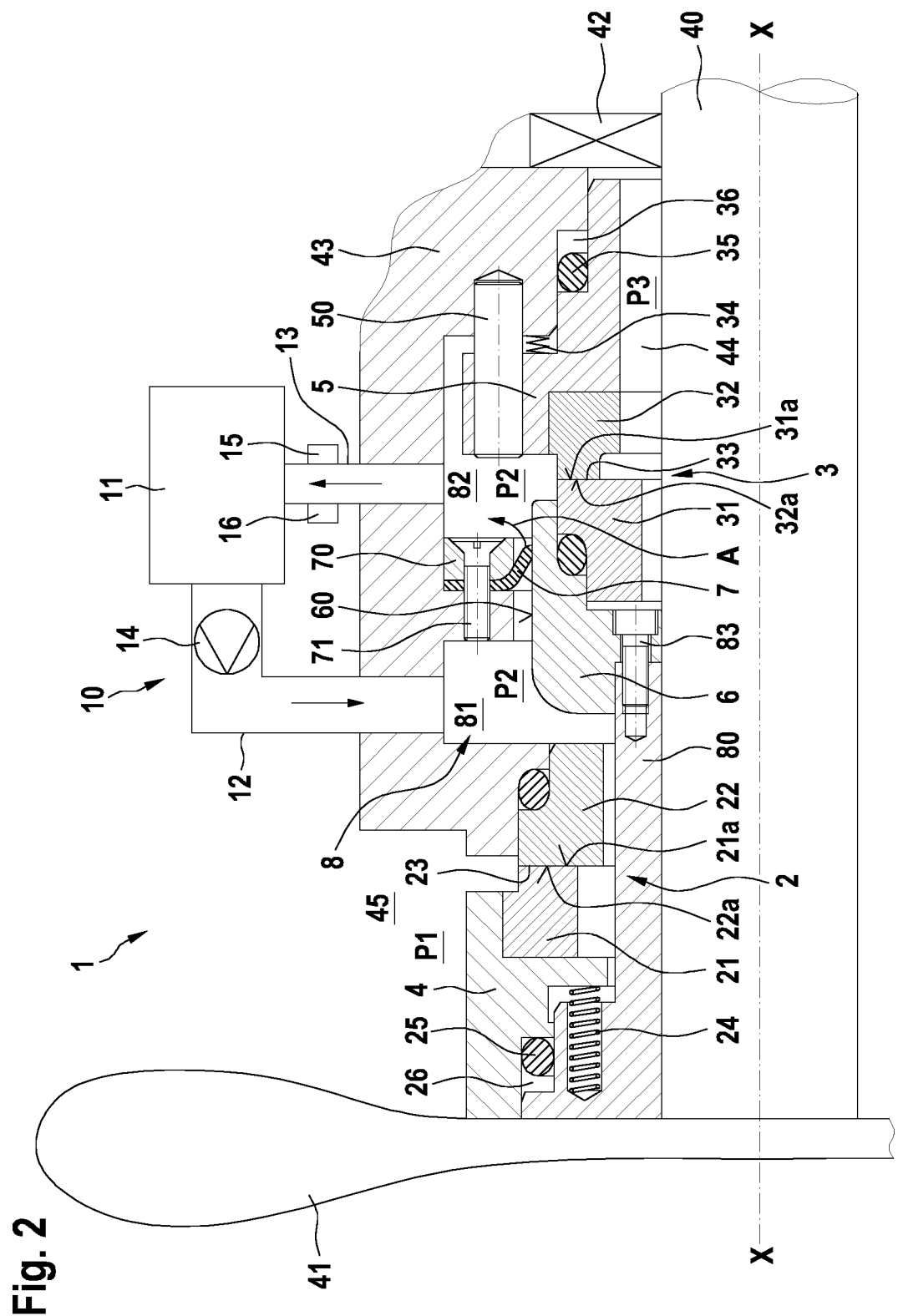
FIG. 2 is a schematic sectional view of the marine mechanical seal arrangement of FIG. 1.

FIG. 2 shows the marine mechanical seal arrangement 1 in detail. As can be seen from FIG. 2, the marine mechanical seal arrangement 1 seals between the water environment 45 and the lubricant-filled cavity 44 at a bearing 42. The bearing 42 thereby supports the drive shaft 40 for the propeller 41, with the marine mechanical seal arrangement 1 located between the drive shaft 40 and a housing 43.

The marine mechanical seal 1 comprises a first mechanical seal 2 and a second mechanical seal 3. The two mechanical seals 2, 3 are arranged in series on the drive shaft 40, with a barrier fluid cavity 8 being present between the two mechanical seals in the axial direction X-X.

The first mechanical seal 2 comprises a first rotating slide ring 21 and a first stationary slide ring 22, which define a first sealing gap 23 between their sliding surfaces 21a and 22a.

Furthermore, the second mechanical seal 3 comprises a second rotating slide ring 31 and a second stationary slide ring 32, which define a second sealing gap 33 between their sliding surfaces 31a and 32a.

The first mechanical seal 2 further comprises a first pretensioning device 24, which comprises a plurality of circumferentially arranged spring elements. The first rotating slide ring 21 is held by a first slide ring carrier 4. The first slide ring carrier 4 is connected to the drive shaft 40 via a sleeve 80. A first secondary seal 25 in the form of an O-ring is provided between the first slide ring carrier 4 and the sleeve 80.

As can be seen from FIG. 2, a first axial deformation space 26 is provided immediately adjacent to the first secondary seal 25. This first axial deformation space 26 is to enable immediate axial advancement of the first mechanical seal 2 by deformation and movement of the first secondary seal 25 into the first axial deformation space 26 during an axial movement of the drive shaft 4.

The first stationary slide ring 22 is connected to the housing 43 and is rotationally fixed thereto.

The second mechanical seal 3 further comprises a second pretensioning device 34, which also comprises a plurality of spring elements arranged in the circumferential direction. As can be seen from FIG. 2, a second secondary seal 35 is arranged to seal between the second slide ring carrier 5 and the housing 43. Herein, the second slide ring carrier 5 is arranged to be axially movable via a plurality of pins 50. A clearance fit is provided between the pins 50 and the second slide ring carrier 5.

A second axial deformation space 36 on the second secondary seal 35 also allows the second mechanical seal 3 to easily follow axial movements of the drive shaft 44 by deforming and moving the second secondary seal 35 into the second axial deformation space 36.

Thus, the first mechanical seal 2 and the second mechanical seal 3 are capable of pressure reversal.

As can be further seen from FIG. 2, the barrier fluid cavity 8 between the first and second mechanical seals 2, 3 is divided into a first sub-cavity 81 and a second sub-cavity 82 by a lip seal 7. The first and second sub-cavities 81, 82 are part of a rinsing circuit or sealing circuit 10, which further comprises a reservoir 11 and a pump 14. An environmentally compatible medium is used here as the barrier medium.

As can be seen from FIG. 2, the reservoir 11 is connected to the first sub-cavity 81 of the barrier fluid cavity 8 via a supply line 12. The second sub-cavity 82 is connected to the reservoir 11 via a return line 13.

An oil separator 15 and a water separator 16 are also shown schematically in FIG. 2.

The lip seal 7 is fixed to the housing 43 by means of a fixing ring 70 and several fixing elements 71 in the form of screws. Herein, the lip seal 7 is arranged such that the sealing lip allows flow from the first sub-cavity 81 to the second sub-cavity 82. This is indicated in FIG. 2 by the arrow A. The sealing lip of the lip seal 7 thereby seals at a third slide ring carrier 6 on a radially outwardly directed surface 60. The third slide ring carrier 6 is further fixed to the sleeve 80, which co-rotates with the drive shaft 40, using a plurality of screws 83. The third slide ring carrier 6 thereby holds the second rotating slide ring 31, as it is shown in FIG. 2.

Thus, a particularly compact design may be achieved.

In normal operation, in which the pump 14 is operated, a first pressure P1 prevails in the environment 45, i.e. in the water. A second pressure P2 prevails in the barrier fluid cavity 8 and a third pressure P3 prevails in the cavity 44 filled with lubricant. Herein, the second pressure P2 in normal operation is greater than the first pressure P1 in the water and the third pressure P3 in the cavity 44 due to the pressure increase caused by the pump 14. Thus, in normal operation, minimal leakage may occur from the first sub-cavity 81 through the first sealing gap 23 to the environment 45 and minimal leakage may likewise occur from the second sub-cavity 82 through the second sealing gap 33 into the cavity 44. The pump 14 of the sealing circuit 10 is not required to be permanently operated, but can provide pressure increase at intervals, thereby firstly rising the pressure in the first sub-cavity 81 above the pressure in the second sub-cavity 82, which then causes the lip seal 7 to open so that pressure equilibrium will be established between the first sub-cavity 81 and the second sub-cavity 82.

According to the invention, in the event of a malfunction or damage to parts of the marine mechanical seal arrangement 1, secure sealing of the lubricating medium in the cavity 44 from the environment 45 may be ensured in any situation.

FIG. 2 shows the state of the marine mechanical seal arrangement 1 where the pump 14 is not operated. Then, the second pressure P2 is smaller than the first pressure P1 and smaller than the third pressure P3. For example, if the second mechanical seal 3 is damaged, lubricant could enter the second sub-cavity 82 from the cavity 44 through an open second sealing gap 33, since the second pressure P2 is smaller than the third pressure P3. Since the lip seal 7 only allows flow from the first sub-cavity 81 toward the second sub-cavity 82, the lubricant located in the second sub-cavity 82 cannot move toward the first sub-cavity 81. If the lubricating medium continues to diffuse toward the reservoir 11, it would be removed from the barrier medium by the oil separator 15. If necessary, the lubricating medium would also be accumulated in the reservoir 11, in which case sensors for detecting the lubricating medium, for example, may be used to ensure that the pump 14 is no longer operated.

If, for example, the first mechanical seal 2 were in turn damaged and the second pressure P2 was less than the first pressure P1, water from the environment 45 could enter the first sub-cavity 81. In the event of appropriate pressure conditions, e.g. when restarting the pump 14, the lip seal 7 could open so that water may continue to flow into the second sub-cavity 82. Since the second mechanical seal 3 is still functional, the second mechanical seal 3 would prevent the water from entering the cavity 44 for the lubricating medium. The water would then be able to be removed from the barrier medium via the water separator 16.

In normal operation with the pump 14 being driven, the lip seal 7 is furthermore operable as a throttle for the barrier fluid between the first sub-cavity 81 and the second sub-cavity 82, besides its sealing function as a safety seal.

In addition to the foregoing written description of the invention, explicit reference will be made to the graphic representation of the invention in FIGS. 1 and 2 for supplementary disclosure thereof.

LIST OF REFERENCE NUMBERS

1 Marine mechanical seal arrangement
2 First mechanical seal
3 Second mechanical seal
4 First slide ring carrier
5 Second slide ring carrier
6 Third slide ring carrier
7 Lip seal
8 Barrier fluid cavity
10 Barrier fluid circuit
11 Reservoir
12 Supply line
13 Return line
14 Pump
15 Oil separator
16 Water separator
21 First rotating slide ring
21a Sliding surface of first rotating slide ring
22 First stationary slide ring
22a Sliding surface of first stationary slide ring
23 First sealing gap
24 first pretensioning device
25 First secondary seal
26 First axial deformation space
31 Second rotating slide ring
31a Sliding surface of second rotating slide ring
32 Second stationary slide ring
32a Sliding surface of second stationary slide ring
33 Second sealing gap
34 Second pretensioning device
35 Second secondary seal
36 Second axial deformation space
40 Drive shaft
41 Propeller
42 Bearing
43 Housing
44 Space for lubricant
45 Environment/Marine water
46 Nacelle
47 Ship
48 Waterline
50 Pin
60 Radially outward sealing surface for lip seal 70 Fixing ring
71 Screw/fixing element
80 Sleeve
81 First sub-cavity
82 Second sub-cavity
83 Screws
A Opening direction of lip seal
X-X Axial direction of mechanical seal arrangement
P1 Ambient pressure
P2 Pressure in barrier fluid cavity
P3 Pressure in lubricant cavity

The invention claimed is:

1. A marine mechanical seal arrangement comprising:
a first mechanical seal including a first rotating slide ring and a second stationary slide ring which define a first sealing gap between their two sliding surfaces,
a second mechanical seal with a second rotating slide ring and a second stationary slide ring, which define a second sealing gap between their sliding surfaces,
a barrier circuit including a barrier fluid cavity which is arranged between the first mechanical seal and the second mechanical seal and is filled with a barrier fluid,
wherein the barrier fluid cavity is divided into a first sub-cavity and a second sub-cavity, wherein the first sub-cavity and the second sub-cavity are separated by a flexible lip seal, wherein the second sub-cavity is arranged on the second mechanical seal, and wherein the lip seal is arranged such that a flow of barrier fluid from the first sub-cavity into the second sub-cavity is allowed and a flow of barrier fluid from the second sub-cavity to the first sub-cavity is prevented.

2. The marine mechanical seal arrangement according to claim 1, wherein the first mechanical seal comprises a first slide ring carrier which is axially pretensioned by means of a first pretensioning device and which is arranged to be axially movable in the axial direction (X-X).

3. The marine mechanical seal arrangement according to claim 2, wherein the first slide ring carrier holds the first rotating slide ring.

4. The marine mechanical seal arrangement according to claim 1, wherein the second mechanical seal comprises a second slide ring carrier which is axially pretensioned by means of a second pretensioning device and which is arranged axially movably in the axial direction (X-X).

5. The marine mechanical seal arrangement according to claim 4, wherein the second slide ring carrier holds the second stationary slide ring.

6. The marine mechanical seal arrangement according to claim 1, further comprising a third slide ring carrier holding the second rotating slide ring of the second mechanical seal, wherein the lip seal seals at the third slide ring carrier.

7. The marine mechanical seal arrangement according to claim 6, wherein the third slide ring carrier comprises a surface facing radially outwards, at which the lip seal seals.

8. The marine mechanical seal arrangement according to claim 1, wherein a first secondary sealing element is arranged on the first slide ring carrier, wherein a first axial deformation space is provided immediately adjacent to the first secondary sealing element.

9. The marine mechanical seal arrangement according to claim 1, wherein a second secondary sealing element is arranged on the second slide ring carrier, wherein a second axial deformation space is provided immediately adjacent to the second secondary sealing element.

10. A marine mechanical seal arrangement according to claim 1, wherein the barrier fluid circuit comprises a barrier fluid reservoir and a pump, wherein the second sub-cavity is connected to the barrier fluid reservoir via a return line, to return barrier fluid from the second sub-cavity to the barrier fluid reservoir, and wherein the barrier fluid reservoir is connected to the first sub-cavity via a supply line to supply barrier fluid from the barrier fluid reservoir to the first sub-cavity.

11. The marine mechanical seal arrangement according to claim 10, further comprising an oil separator and/or a water separator.

12. A marine propulsion comprising a drive shaft and a marine mechanical seal arrangement according to claim 1, wherein the marine mechanical seal arrangement seals a cavity for a lubricating medium from an environment.

* * * * *